Dec. 10, 1968 — E. O. S. TORP — 3,415,285

PACKING MEANS FOR CONDUITS

Filed Sept. 24, 1965 — 2 Sheets-Sheet 1

INVENTOR.
EGIL ODVAR SEVERIN TORP
BY Young & Thompson
ATTYS.

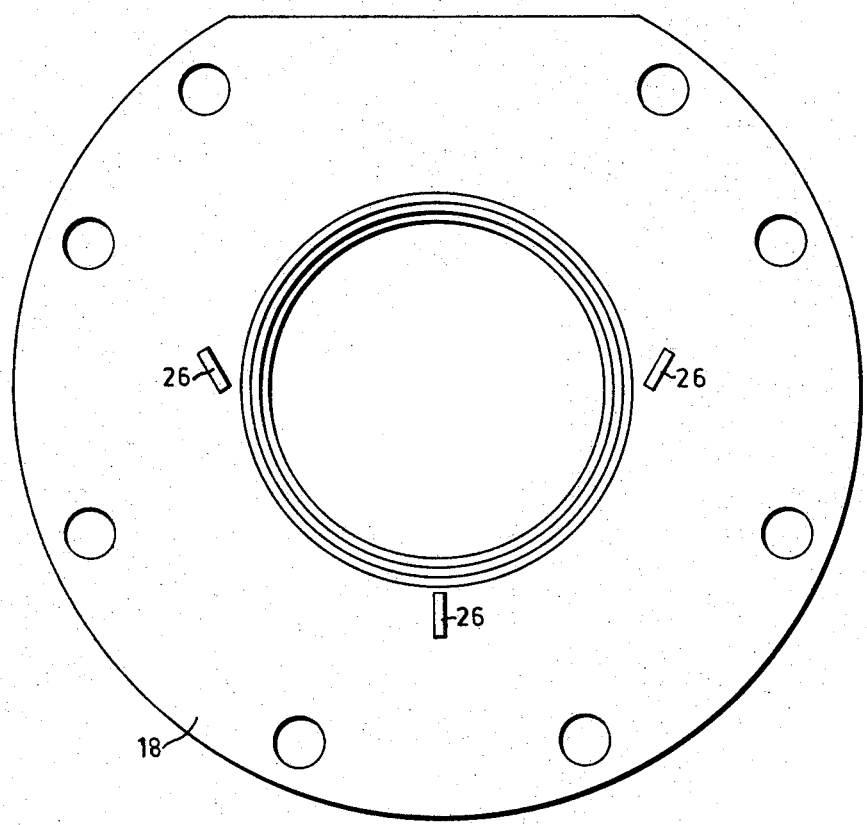

United States Patent Office 3,415,285
Patented Dec. 10, 1968

1

3,415,285
PACKING MEANS FOR CONDUITS
Egil Odvar Severin Torp, Lidingo, Sweden, assignor to Ingenjorsfirma G. Karlbom AB, a corporation of Sweden
Filed Sept. 24, 1965, Ser. No. 489,902
3 Claims. (Cl. 138—94.3)

ABSTRACT OF THE DISCLOSURE

A packing between two tubes includes a gland slidable in one of the tubes and having an impervious resilient sleeve sealed between the gland and the tube in which the gland slides. The gland and both tubes have radially outwardly extending flanges, with the gland flange disposed between the tube flanges. Screws axially abut against and between the tube flanges and are screw threaded to the gland flange, so that the screws can be rotated in either direction to move the gland toward or away from the tube within which the gland does not slide, thereby to permit insertion of a plate or other member between the gland and the tube within which the gland does not slide.

---

The invention relates to conduits in which a substantially tubular packing has its one end clamped in a sealed manner to a tube and has its other end sealed and clamped to a gland displaceable in said tube, the gland being provided with a radial sealing surface for a blind-flange, throttle flange or a similar element adapted to be mounted at one end of the tube. The displacement of the gland is adapted to facilitate the application of the blind-flange or the like without the necessity of moving or displacing the tube end or a further end in a conduit joined with the former tube end.

The primary object of the invention is to provide an efficient seal between the gland and the tube end while maintaining the desired possibility of displacement.

The invention also includes simple means for enabling displacement of the gland in relation to the tube end.

Figure 1:
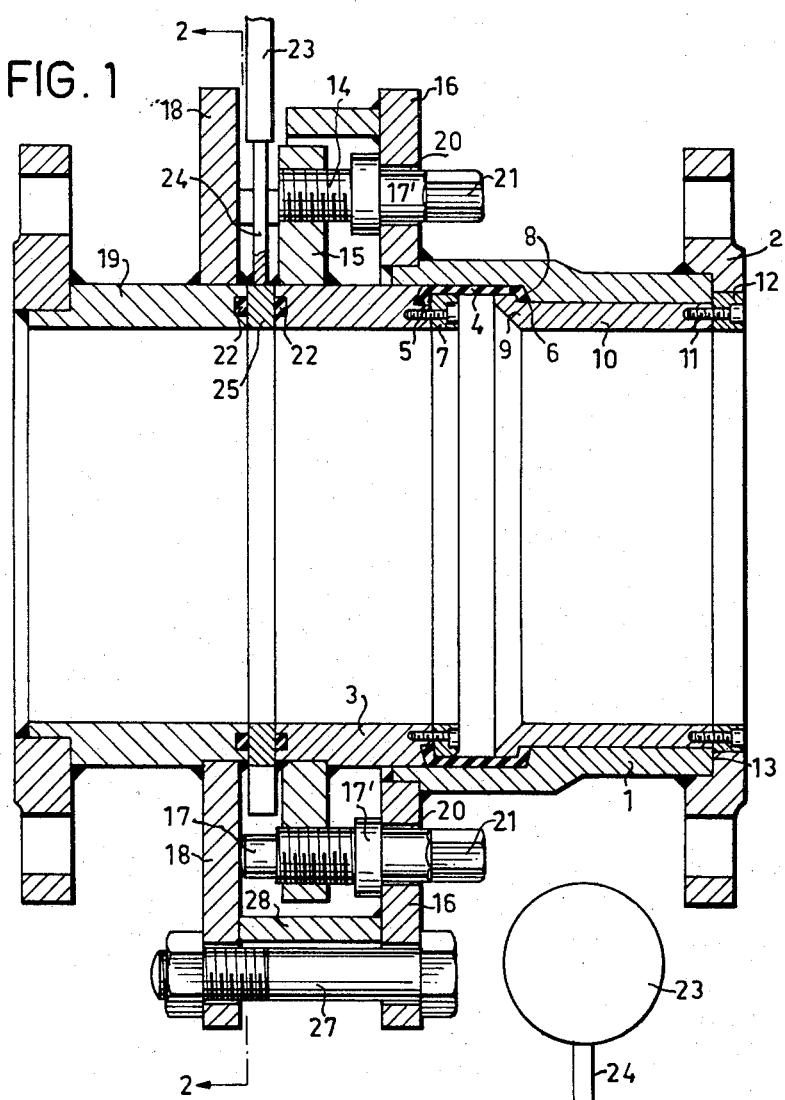
Figure 3:
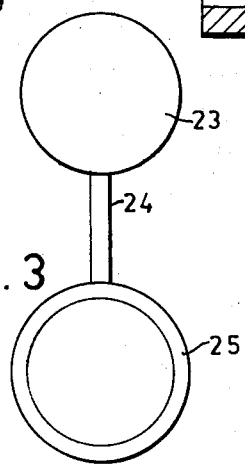

An embodiment of the invention will be described with reference to the accompanying drawing, in which FIG. 1 illustrates an axial section of the means, FIG. 2 is a radial section on line 2—2 in FIG. 1, and FIG. 3 shows a cover flange adapted to be inserted between the tube ends.

With reference to the drawings 1 designates a tube member which is intended to be included permanently in a conduit, and to this end, may be provided with a flange 2 to be joined with a further tube member included in the conduit. A gland 3 is displaceably fitted into one end of the tube member 1. The gland is joined with a tube member 1 by means of a collar packing 4 in a sealed manner. The packing 4 which may be made from rubber or any other suitable resilient material has its ends provided with flanges 5, 6, one 5 of which is clamped in a sealed manner between the end of gland 3 located in the tube member 1 and a clamping ring 7 which is secured by screws at the end surface of the gland 3. The other flange 6 of the packing is clamped in a sealed manner between a shoulder 8 on the tube member 1 and a flange 9 on an attaching sleeve 10 which is displaceably inserted in the tube member 1. Flange 9 of the attaching sleeve 10 may be clamped against the packing flange 8 by axial screws 11 which are screwed into the outer end of the sleeve 10 and are carried freely through a clamping ring 12 which is located inside the flange 2 and has engagement with a radial surface 13 on the tube member 1.

The displacement of the gland 3 is rendered possible by means of a screw connection which, in the embodiment illustrated, consists of a number of screws 17 which are screwed into holes in a flange 15 secured to the gland, said screws 17 axially engaging a flange 16 secured to the tube member 1. Said engagement is effected by a collar 17'. The screws 17 have their one end in axial engagement with a flange 18 on a tube member 19 by which the conduit may continue at the other side of the packing means. One screw 14 is shorter than the remainder of the screws 17 so that there is a space open at the top for inserting a cover flange or the like. All of the screws 17 may be equal and spaced so as to leave a sufficient space at the top. The screws 14, 17 are carried freely through holes 20 in the flange 16 of tube member 1 and are provided with key surfaces 21 outside said flange. This arrangement enables displacement of the gland axially in one direction as well as in the opposite direction by means of the screws.

A displacement of the gland 3 to the right in FIG. 1 results in a compression and bulging inwardly of the packing collar 4 which is possible since the packing is resilient. Because the ends of the packing are clamped in a sealed manner to the gland 3 and the tube member 1, respectively, the seal is maintained between said elements in spite of the displacement. The displacement enables insertion of a desired element such as a blind-flange 23 between the end surfaces of the tubular element 19 and the gland 3 without the necessity of moving the tube element 19 relative to the tube member 1. The end surfaces of the tubular member 19 are provided with packings such as O-rings 22. In the embodiment illustrated the blind-flange 23 is connected by a shaft 24 with a ring 25 which is shown in FIG. 1 as inserted between the tubular element 19 and the gland 3, the arrangement permitting a free flow of liquid or other medium through the conduit. If the flow is to be interrupted, the gland 3 is displaced, by means of the screws 17, to the right in FIG. 1 whereupon the ring 25 may be removed and the cover flange 23 is inserted between the gland and the tube element 19. The gland 3 may then be returned to the left in FIG. 1 by the screws 14 to a sealed engagement against the blind-flange. As illustrated in FIG. 2, the flange 18 on the tubular element 19 is provided with projections 26 which facilitate the insertion of the ring 25 and the blind-flange 23 and their maintenance in correct position.

The tubular members 1 and 9 are kept in constant axial position in relation to one another by screw bolts 27 which are carried freely through holes in the flanges 16, 18, and by means of an axial supporting spacer 28 which is secured to one flange 16 and engages the other flange 18.

Although the invention is illustrated in connection with packing means between two tube ends adapted to be included in a conduit it may also be applied to a terminal of a conduit, where for instance a blind-flange is to be mounted for closing the tube end. The details illustrated in the drawings are only intended as illustrative examples.

What I claim is:
1. A packing means for conduits including a pair of axially aligned tubes, each of said tubes having a radially outwardly extending flange thereon, a gland mounted for axial displacement in one of the tubes, the gland having a radially outwardly extending flange thereon which is disposed between said tube flanges, one end of said gland being disposed within said one tube and the other end of said gland being exterior of said one tube, a tubular packing of impervious resilient material having one end sealingly clamped to said one tube and its other end sealingly clamped to the gland and said packing being so constructed and arranged as to allow relative axial movement between said gland and said one tube, said other tube and the exterior end of said gland having opposed radially disposed sealing surfaces thereon, screw means having threaded engagement with threaded holes in the gland flange and being in axial abutment with said tube flanges whereby said gland moves axially relative to said tubes upon rotation of said screw means into and out of sealing engagement with an element positioned between said sealing surfaces, and retaining means to retain said flanges of said tubes in fixed spaced relationship.

2. A packing means as claimed in claim 1, and further screw means having screw-threaded engagement with threaded holes in the gland flange and having means thereon engaging the flange of said one tube but being spaced from the flange of said other tube so that said element may be inserted between the flange of said other tube and said further screw means and then between said radial sealing surfaces.

3. A packing means as claimed in claim 1, wherein said retaining means includes a spacer member extending between said tube flanges to maintain said tube flanges a minimum distance apart within the limit of axial movement of said gland.

References Cited

UNITED STATES PATENTS

| | | | |
|---|---|---|---|
| 1,702,066 | 2/1929 | Valentine | 285—299 |
| 1,893,434 | 1/1933 | Muller | 285—300 |
| 2,437,385 | 3/1948 | Halford. | |
| 2,558,247 | 6/1951 | Hamer | 138—94.3 |
| 2,706,134 | 4/1955 | Wilson et al. | 285—298 X |
| 3,131,642 | 5/1964 | Geer et al. | 285—302 X |
| 3,298,680 | 1/1967 | Jablin | 285—300 X |

FOREIGN PATENTS 1,095,617   12/1954   France.

CARL W. TOMLIN, *Primary Examiner.*

D. W. AROLA, *Assistant Examiner.*

U.S. Cl. X.R.

285—302, 175, 368